(12) United States Patent
Schmidt

(10) Patent No.: US 6,273,221 B1
(45) Date of Patent: Aug. 14, 2001

(54) SERVO-MOTOR BRAKE

(75) Inventor: Thomas Allan Schmidt, Eden Prairie, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 0 days.

(21) Appl. No.: 09/187,996

(22) Filed: Nov. 6, 1998

(51) Int. Cl.[7] .................................................... F16D 65/24
(52) U.S. Cl. ........................ 188/170; 188/72.7; 188/73.1
(58) Field of Search .................................. 188/170, 166, 188/167, 168, 196 P, 196 D, 71.4, 71.3, 73.1, 73.2, 72.1, 72.2, 72.7

(56) References Cited

U.S. PATENT DOCUMENTS

| | | | |
|---|---|---|---|
| 2,109,722 | * | 3/1938 | Fawick ................................ 188/72.2 |
| 2,292,704 | | 8/1942 | Lillquist . |
| 2,425,856 | * | 8/1947 | Ash ..................................... 188/73.2 |
| 3,195,692 | | 7/1965 | Herr et al. . |
| 3,198,293 | | 8/1965 | Mathews . |
| 3,337,010 | | 8/1967 | Wrensch . |
| 3,357,528 | | 12/1967 | Verlinde . |
| 3,470,987 | | 10/1969 | Kroeger . |
| 3,586,136 | * | 6/1971 | Kamman ............................. 188/170 |
| 3,586,137 | | 6/1971 | Kamman . |
| 3,605,958 | | 9/1971 | McCarthy . |
| 3,677,377 | | 7/1972 | Miller . |
| 3,688,877 | | 9/1972 | Day . |
| 3,822,768 | | 7/1974 | Sebulke . |
| 3,982,610 | * | 9/1976 | Campagnolo ...................... 188/18 A |
| 4,030,583 | | 6/1977 | Miller . |
| 4,099,601 | | 7/1978 | Pittman . |
| 4,103,763 | | 8/1978 | Glöckner et al. . |
| 4,114,732 | * | 9/1978 | Dunn .................................. 188/73.2 |
| 4,128,145 | * | 12/1978 | Euler .................................. 188/71.2 |
| 4,129,797 | | 12/1978 | Lindner . |
| 4,185,539 | | 1/1980 | Stratienko . |
| 4,361,078 | | 11/1982 | Cape et al. . |
| 4,582,187 | | 4/1986 | Sekella . |
| 4,615,418 | * | 10/1986 | Atwell ................................ 188/170 |
| 4,696,378 | | 9/1987 | Brooks . |
| 5,154,261 | * | 10/1992 | Tanaka et al. ..................... 188/171 |

FOREIGN PATENT DOCUMENTS

| | | |
|---|---|---|
| 636888 | 10/1936 | (DE) . |
| 1413305 | 10/1964 | (FR) . |
| 1040864 | 9/1966 | (GB) . |
| WO8102614 | 9/1981 | (WO) . |
| WO9626327 | 8/1996 | (WO) . |

* cited by examiner

Primary Examiner—Robert J. Oberleitner
Assistant Examiner—Robert A. Siconolfi
(74) Attorney, Agent, or Firm—Alan Kamrath; Rider, Bennett, Egan & Arundel, LLP

(57) ABSTRACT

A brake (10) for a servo-motor (96) includes a housing (28) having first and second housing portions (30, 32) and in which an input (12) is rotatably mounted by a bearing (60). The pilot (98) of the servo-motor (96) is received in an enlarged recess (40) while the shaft (21) passes through an axial opening (38) and is secured in an axial bore (20) of the input (12) by a coupling (106) to align the brake (10) with the servo-motor (96). The brake (10) is secured to the servo-motor (96) by screws (108) which extend through elongated, radially elongated slots (46). A wedge shaped friction facing (82) is biased to engage an interface surface (26) of the input (12) and a friction surface portion (70) of the housing (28) by a spring (94) extending between a radial surface (92) and the first housing portion (30). The friction facing (82) is moved to a disengaged position by a piston (100) slideable under fluid pressure in a chamber (62) of the second housing portion (32).

21 Claims, 2 Drawing Sheets

SERVO-MOTOR BRAKE

BACKGROUND

The present invention generally relates to apparatus for controlling rotation of an input relative to an output, particularly relates to rotational control apparatus for use with servo-motors, and specifically relates to servo-motor brakes.

Servo-motors are increasingly being used as drives in the control of machinery component movement. There are servo-motor applications where it is desirable to stop movement of the machinery component being driven including but not limited to parking or emergency stop situations but also in the event of disruption of power to the servo-motor. Typically, servo-motors were purchased from manufacturers either with or without an integral braking component. However, a need has arisen for a brake to be added as a module separately to servo-motors. In particular, this would allow servo-motor users to purchase a standard servo-motor for all applications (assumedly at a lower per unit price due to quantity discounts) and then to add a brake module to the servo-motor only in applications where braking is needed or desired. In a preferred aspect, it would be desirable that such add on servo-motor brakes have performance characteristics which exceed those of integral servo-motor and brake units and which minimize the overall product size.

A major obstacle to satisfying this need is that the servo-motor industry has not adopted a standard configuration. In particular, the drive shafts of servo-motors are of different radial sizes. Also, although typically including a pilot on the output face, the sizes and shapes of pilot faces differ between manufacturers of servo-motors. Additionally, although typically the output face includes four bores which may be threaded and which were located at the corners of a square larger than the pilot and for receipt of screws extending from the apparatus component to be driven, such bores were of different diameters and were located at different radial spacings from the drive shaft. To reduce inventory requirements and to take advantage of mass production, it is desirable that brakes intended to be modules for attachment to servo-motors should have universal application to all servo-motors of whatever manufacturer and should be easily and readily modifiable to that of the particular servo-motor to which it is desired to be attached.

SUMMARY

The present invention solves this need and other problems in the field of rotation control by providing, in the preferred form, a plurality of slots extending radially inwardly from the outer surface of an annular disc of a housing portion, with each of the slots adapted to receive a is screw for attachment to a drive such as a servo-motor, and with an axially extending recess formed in the face of the annular disc for receiving the pilot of the servo-motor. In most preferred aspects of the present invention, alignment of the servo-motor with the housing portion is obtained by receipt of the drive shaft of the servo-motor in an axial bore of the input of the rotational control apparatus, with an expandable coupling being utilized in the most preferred form to allow the axial bore to be of a standard size but connected to different sizes and shapes of drive shafts.

In another aspect of the present invention, a wedge shaped annular friction facing is moved between an engaged position and a disengaged position, with the input and output being rotatably independent in the disengaged position and being rotatably related for rotation together when first and second surfaces of the annular friction facing interface with an interface surface of the input and the friction surface of the output, respectively, with the interface and friction surfaces extending in opposite, nonparallel angles to the rotational axis of the input.

It is thus an object of the present invention to provide a novel rotational control apparatus.

It is further an object of the present invention to provide such a novel rotational control apparatus having special application for servo-motors.

It is further an object of the present invention to provide such a novel rotational control apparatus which can be easily added as a module to drives of differing configurations.

It is further an object of the present invention to provide such a novel rotational control apparatus which can be readily modified to that of the particular drive to which it is secured.

It is further an object of the present invention to provide such a novel rotational control apparatus which maximizes performance characteristics while minimizing size.

It is further an object of the present invention to provide such a novel rotational control apparatus having fewer number of parts which can be easily fabricated.

It is further an object of the present invention to provide such a novel rotational control apparatus having low inertia.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
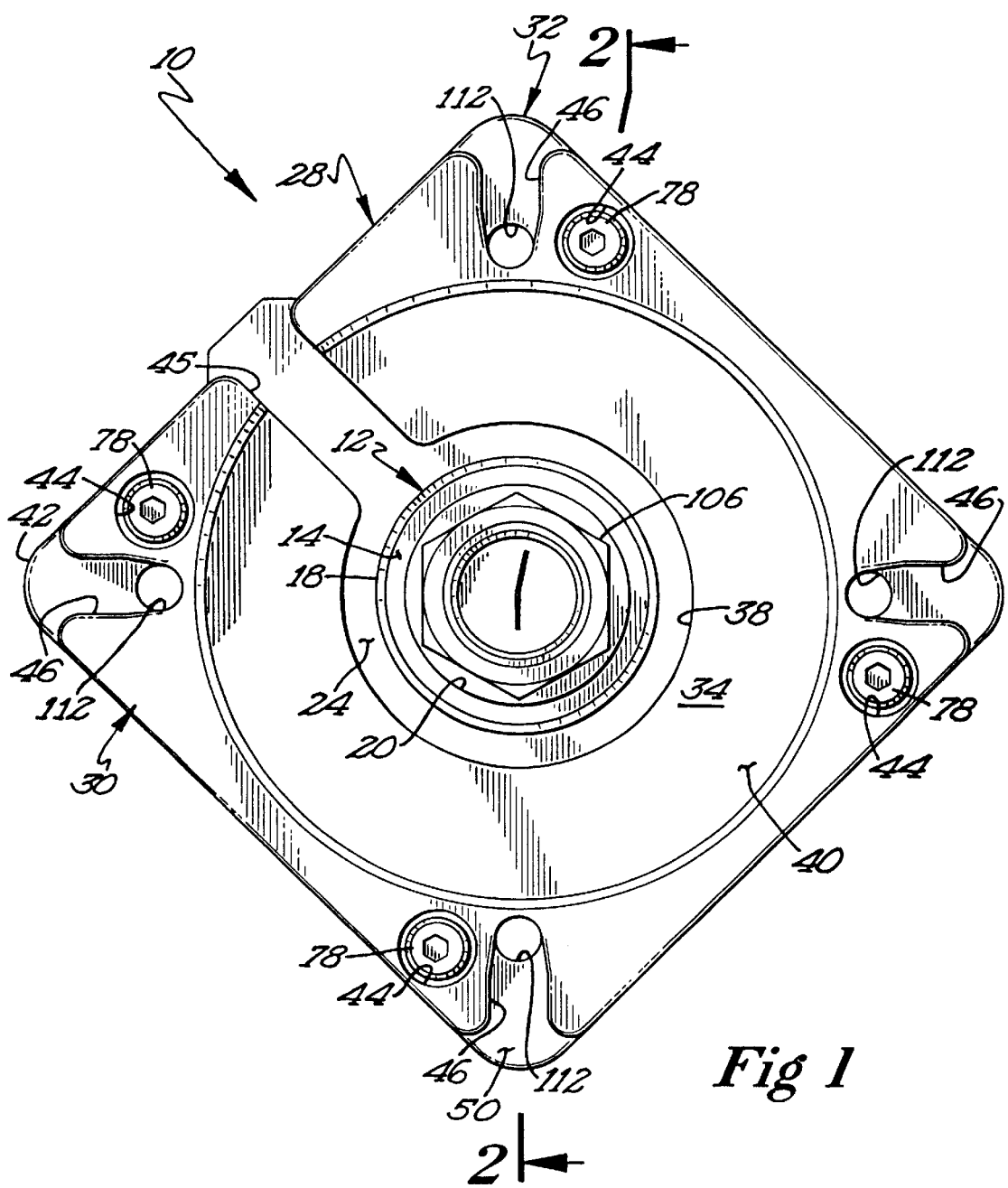
FIG. 1 shows an end view of a rotational control apparatus in the most preferred form of a brake having special application to servo-motors.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "inside", "outside", "outer", "inner", "end", "side", "axial", "radial", and similar terms are used herein, it should be understood that these terms have reference only to the structure shown in the drawings as it would appear to a person viewing the drawings and are utilized only to facilitate describing the illustrative embodiment.

DESCRIPTION

Figure 2:
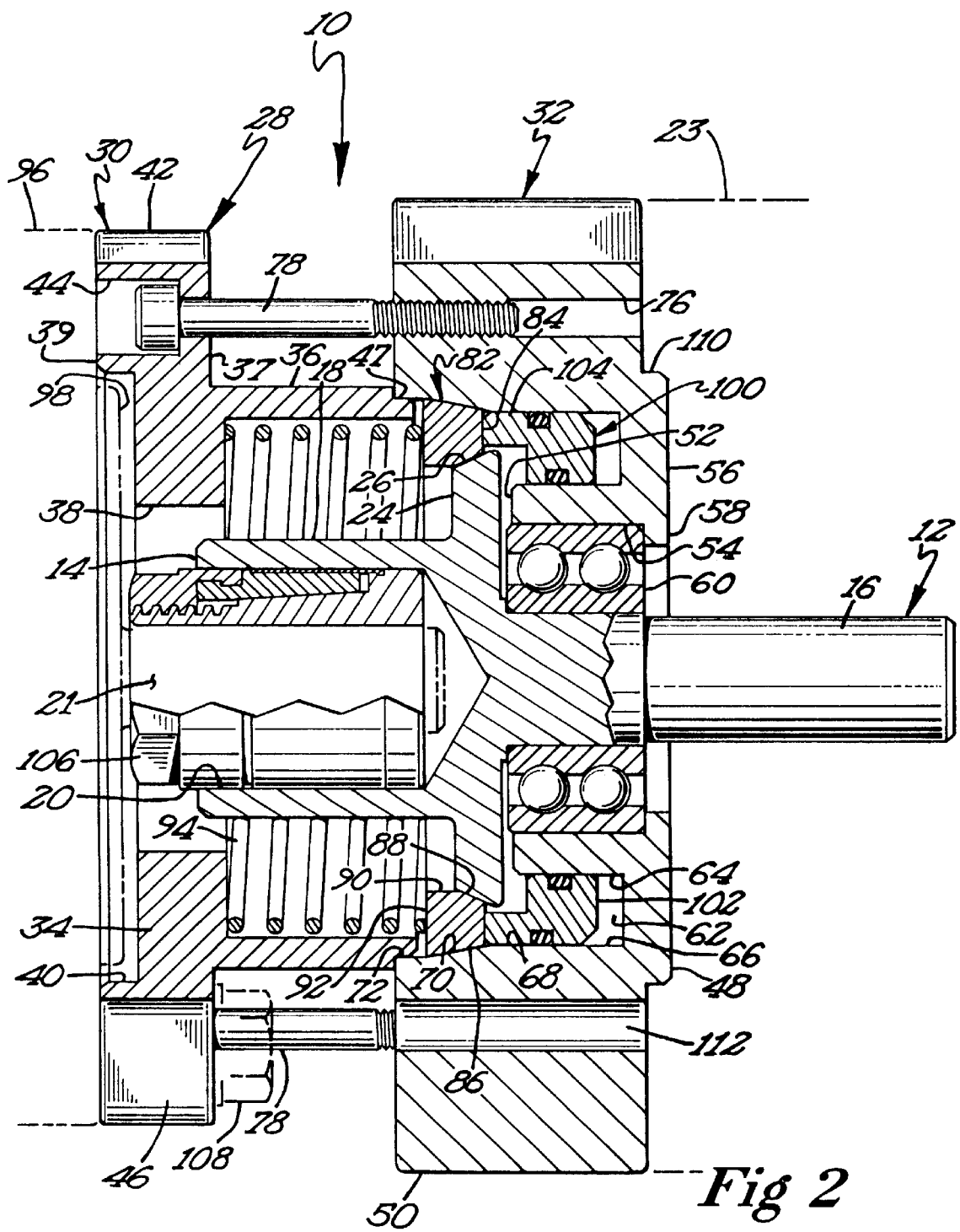
FIG. 2 shows a cross sectional view of the rotational control apparatus of FIG. 1 according to section line 2—2 of FIG. 1, with a servo-motor and apparatus component to be driven thereby being shown partially and in phantom.

A rotational control apparatus according to the preferred embodiment of the present invention is shown in the drawings as a spring engaged fluid released brake and is generally designated 10. Brake 10 is shown in its most preferred form for rotationally controlling an input 12. Input 12 generally includes a first axial portion 14 and a second axial portion 16. Portion 14 has an outer surface 18 of generally circular cross sections and an internal, axially extending bore 20 for receipt of a shaft 21 of a power source 96 in a nonrotatable manner. In the most preferred form, brake 10 is utilized with an electric servo-motor 96, with shaft 21 being part of servo-motor 96. Portion 16 is in the form of a shaft for interrelation with a machine, robot, or other apparatus component 23 being controlled by servo-motor 96. In its most preferred form, input 12 further includes a radially extending interface 24 generally at the interconnection between portions 14 and 16. Interface 24 terminates in an annular interface surface 26 extending at a nonparallel angle to the axis of input 12 and to the radial direction to the axis of input 12 and specifically extends radially outwardly to the axis when viewing FIG. 2 from left to right. In the most preferred form, surface 26 extends at an angle in the order of 20° to 25° to the axis of input 12. Surface 26 is at a relatively short radial spacing from the axis of input 12 and in the most preferred form which is less than twice the radial spacing of surface 18 from the axis of input 12. In the most preferred form, portions 14 and 16 and interface 24 of input 12 are integrally formed as a single piece of material.

Brake 10 further includes an output shown as a housing 28 in its most preferred form, with input 12 being rotatable relative to and in the most preferred form within housing 28 about its axis. Housing 28 includes a servo-motor attachment housing portion 30 and an air-chamber housing portion 32. Housing portion 30 generally includes a radially oriented, annular disc 34 and a generally axially extending cylindrical member 36 extending from a first face 37 of disc 34. Disc 34 according to the teachings of the present invention includes an axial opening 38 extending through first face 37 and its second, opposite face 39 of disc 34 and having a size greater than shaft 21 of servo-motor 96 and in the most preferred form of a radial size greater than surface 18 of input 12. Disc 34 further includes a cylindrical recess 40 extending from second face 39 of disc 34 towards but spaced from first face 37. Recess 40 is generally concentric to opening 38 and is of a radial size greater than opening 38 and is of a radial size at least equal to or preferably slightly larger than the largest pilot 98 of servo-motor 96 available on the market.

The outer surface 42 of disc 34 is of a generally square shape. Apertures 44 extend through first and second faces 37 and 39 of disc 34 at a radial spacing greater than cylindrical member 36 and cylindrical recess 40, with apertures 44 being counterbored from second face 39 towards but spaced from first face 37 in the most preferred form. Four apertures 44 are provided in the form shown adjacent to but equally circumferentially offset of the corners of the square shape of outer surface 42 of disc 34. Disc 34 according to the preferred teachings of the present invention further includes slots 46 circumferentially spaced from apertures 44 extending radially inwardly from each of the corners of the square shape of outer surface 42 of disc 34. Slots 46 in the form shown have an inner radial extent generally equal to but slightly greater than the outer surface of cylindrical member 36. A radial tool channel 45 extends perpendicularly from one of the sides of the square shape of outer surface 42 and radially intersects with axial opening 38. Channel 45 extends from face 39 of disc 34 towards but spaced from face 37.

The inner and outer surfaces of cylindrical member 36 are circular in cross section in the most preferred form and are concentric with the axis of input 12 and axial opening 38. Cylindrical member 36 of housing portion 30 includes an annular shoulder 47 extending inwardly from its free axial end and its outer surface.

Housing portion 32 generally includes a radially oriented, annular collar 48 and an integral ring 50 extending generally axially from a first face 52 of collar 48. Collar 48 according to the teachings of the present invention includes an axial opening 54 extending through first face 52 and the opposite, second face 56 and having a size greater than axial portion 16 and in the most preferred form of a radial size generally equal to surface 18 of axial portion 14. A shoulder 58 extends into opening 54 generally coextensive with face 56 and of an axial length considerably shorter than the axial length of opening 54.

Input 12 is rotatably mounted to housing portion 32 by a bearing 60. Particularly, bearing 60 includes an inner race received on axial portion 16 and having an inner end generally abutting with axial portion 14 and interface 24. Bearing 60 further includes an outer race received in opening 54 and having an outer end abutting with shoulder 58. The outer surface of collar 48 is coextensive with the outer surface of ring 50 and in the most preferred form is generally square in shape of a size generally corresponding to outer surface 42 of housing portion 30. Collar 48 includes an annular piston chamber 62 having an axially extending inner surface 64 of a radial size greater than opening 54 and having an axially extending outer surface 66 of a radial size greater than surface 64.

Ring 50 includes a first axially extending inner surface 68 of a radial size and coextensive with surface 66. Axially inward of and coextensive with surface portion 68 is a second, intermediate, inner, friction surface portion 70 which extends at a nonparallel angle to the axis of input 12 and in the most preferred form at an angle in the order of 10° to the axis of input 12. In the most preferred form, surface portion 70 extends radially inwardly to the axis of input 12 when viewing FIG. 2 from left to right. Axially inward of and coextensive with surface portion 70 is a third, axially extending inner surface portion 72 of a radial size greater than surface portion 68 and generally equal to and for receipt in shoulder 47 of housing portion 30. Threaded bores 76 extend axially through ring 50 and collar 48 of housing portion 32 and at radial spacing and location corresponding to apertures 44 of housing portion 30. Housing portions 30 and 32 are retained in position by screws 78 extending through apertures 44 and threaded into bores 76. Housing portions 30 and 32 are retained in axial position relative to each other by the receipt of surface portion 70 and the free end of ring 50 of housing portion 32 in shoulder 47 of cylindrical member 36 of housing portion 30. Suitable provisions are provided in housing portion 32 for the introduction of fluid under pressure into piston chamber 62 in housing portion 32.

Brake 10 according to the preferred teachings of the present invention further includes an annular friction facing 82 of a generally wedge shape. In particular, friction facing 82 includes a first radially extending surface 84 of a radial size generally equal to but slightly less than and for receipt between surface 26 and surface portion 70. Friction facing 82 further includes an outer surface 86 extending from surface 84 and of a radial size and shape corresponding to and for frictionally engaging and interfacing with surface portion 70. Friction facing 82 also includes an inner surface including a first surface portion 88 extending from surface 84 and of a radial size and shape corresponding to and for frictionally engaging with surface 26. The inner surface of friction facing 82 also includes a second surface portion 90 extending axially inwardly from surface portion 88. Friction facing 82 further includes a second radially extending surface 92 extending between the inner ends of surface 86 and surface portion 90. Thus, surface 86 and surface portion 88 have increasing spacing with increasing radial spacing from surface 84 and have decreasing radial spacing with increasing spacing from surface 92.

Brake 10 according to the preferred teachings of the present invention further includes suitable provisions for moving friction facing 82 between an engaged position and a disengaged position. In the most preferred form, friction facing 82 is moved to an engaged position by being biased by a compression spring 94 extending axially between surface 92 of friction facing 82 and face 37 of housing portion 30 and positioned adjacent to the inner surface of cylindrical member 36.

In the most preferred form, friction facing 82 is moved to a disengaged position by an annular piston 100 slideably received in piston chamber 62. In the most preferred form, piston 100 has L-shaped radial cross sections including a piston body 102 having inner and outer surfaces corresponding to and for slideable receipt in surfaces 64 and 66. Suitable sealing provisions such as O-rings as shown are provided between piston body 102 and chamber 62. Piston 100 further includes an annular flange 104 extending axially from body 102, with annular flange 104 having an outer surface coextensive with and at the same radial spacing as the outer surface of body 102 and of a maximum radial size generally equal to and for slideable receipt in surface portion 68. Flange 104 has a radial size less than body 102 and less than and for receipt between surface 26 and surface portion 70. Flange 104 terminates in a free end for abutting with radially extending surface 84 of friction facing 82. Flange 104 allows body 102 to have greater cross sectional area in piston chamber 62 for force generation by the fluid pressure while minimizing the radial spacing between surface 26 and surface portion 70 and the radial extent of surface 84 and of friction facing 82. With the introduction of fluid into chamber 62, piston 100 axially slides relative to housing portion 32 under fluid pressure to move friction facing 82 from the engaged position to the disengaged position against the bias of spring 94. Axial movement of friction facing 82 by piston 100 is limited by the abutment of surface 92 with the free end of cylindrical member 36 of housing portion 30.

Now that the basic construction of brake 10 according to the preferred teachings of the present invention has been set forth, a preferred application and some of the advantages of brake 10 can be explained. In particular, shaft 21 of servo-motor 96 is axially extended into and secured in axial bore 20. In the most preferred form as shaft 21 can be any one of a variety of differing sizes and shapes and to allow bore 20 to be of a standard size for ease of manufacture of input 12, an expandable coupling 106 is utilized to secure shaft 21 in bore 20. In particular, coupling 106 includes first and second components which are axially movable relative to each other such as by the use of threadable interconnection to provide an outer axial surface for nonslideable receipt in bore 20 and an inner axial surface for nonslideable receipt of input shaft 21 of whatever size and shape. In particular, shaft 21 is inserted on coupling 106 in turn inserted in bore 20, with coupling 106 in an unexpanded condition. Servo-motor 96 and brake 10 are moved relative to each other with pilot 98 received in recess 40 until face 39 of housing portion 30 abuts with the face of servo-motor 96 radially outwardly of pilot 98. At that time, a wrench or similar tool can be inserted through tool channel 45 for purposes of expanding coupling 106 into its expanded condition and thereby securing shaft 21 in axial bore 20.

It should be appreciated that alignment between brake 10 and servo-motor 96 is obtained by the receipt of shaft 21 (and coupling 106 in the most preferred form) in bore 20. In particular, it is not necessary that recess 40 be slideably received on pilot 98 with a close tolerance for alignment purposes. In fact, in the most preferred form, recess 40 is normally larger than pilot 98 of whatever size and shape of the particular servo-motor 96. Thus, recess 40 according to the preferred teachings of the present invention does not need to be machined or otherwise modified to match the particular size and shape of pilot 98 of any particular servo-motor 96, but rather recess 40 allows housing portion 30 to be of a universal, standard design independent of the particular servo-motor 96 to which brake 10 is to be applied.

After shaft 21 has been aligned with bore 20, screws 108 can be inserted into slots 46 and threaded into the threaded bores in the face of servo-motor 96 or secured by nuts in the case of plain bores. A wrench or similar tool can be inserted between face 37 of disc 34 and the free end of ring 50 for purposes of tightening screws 108. In this regard, screws 108 can be positioned in slots 46 at a radial position corresponding to the radial positions of the bores of servo-motor 96. In particular, the bores of servo-motor 96 could be at different radial spacings from shaft 21 according to the particular manufacturer of servo-motor 96. Thus, slots 46 or disc 34 according to the preferred teachings of the present invention do not need to be machined or otherwise modified to match the particular locations of the bores of any particular servo-motor 96 but rather slots 46 allow housing portion 30 to be of a universal, standard design independent of the particular servo-motor 96 to which brake 10 is to be applied.

In the most preferred form of the present invention, face 56 of housing portion 32 includes a pilot 110 for receipt of component 23 and bores 112 for receipt of screws for securing component 23 to housing 28 of brake 10 according to the teachings of the present invention. Although it would be advantageous for input 12 and housing portion 32 to be universal in all applications, it may be desirable to machine face 56 to include pilot 110 and threaded bores 112 to correspond to pilot 98 and the bores of the particular servo-motor 96 that brake 10 is being applied to. Similarly, it may be desirable to machine shaft portion 16 axially outward of bearing 60 to be of a size and shape corresponding to the size and shape of shaft 21 of the particular servo-motor 96 that brake 10 is being applied to. Thus, axial portion 16 and face 56 would present the same connection configuration with component 23 as servo-motor 96 would if brake 10 according to the teachings of the present invention were not provided.

According to the preferred teachings of the present invention, friction facing 82 provides an interface between input 12 and housing 28 with a wedge action. This wedge action creates a mechanical advantage in increasing the amount of torque which can be transferred through input 12, housing 28, and facing 82 versus the amount of biasing force produced by spring 94. Specifically, such a wedging action results in much greater force transfer than if linear surfaces were simply abutted together such as in conventional flat plate or conical type control apparatus.

Additionally, the wedging action produced by a wedge shaped friction facing 82 provides several advantages. First, the force of spring 94 can be minimized while still providing the required torque transfer which in the most preferred form is of an amount sufficient to stall servo-motor 96. Also, the axial extent of brake 10 can be minimized according to the teachings of the present invention. But more importantly, the radial extent of brake 10 can be minimized and in the most preferred form generally corresponds to the radial extent of servo-motor 96. Additionally, surface 26 can be positioned radially inward to minimize the radial extent of interface 24. This is very important in minimizing the distance of the mass of input 12 from the rotational axis and thus the inertia forces which are placed upon servo-motor 96. Furthermore, the integral fabrication of input 12 according to the most preferred form of the present invention plays an important factor in minimizing the total mass which is rotated by servo-motor 96 and thus in minimizing the inertia forces which are placed upon servo-motor 96. Since inertia forces are dependent upon the amount of mass being rotated and the distance of the mass from the rotation axis, brake 10 according to the preferred teachings of the present invention minimizes inertia forces which is important in start-up and stopping of servo-motor 96 in normal operation. In addition to reducing inertia forces, the integral fabrication of input 12 is simpler and less expensive and results in a stiffer component than if input 12 were fabricated from multiple pieces.

It should be appreciated that due to the wedging action provided by friction facing 82 according to the preferred teachings of the present invention, friction facing 82 will be subject to considerable wear in normal operation. Thus, according to the preferred teachings of the present invention, brake 10 is held in its disengaged position by the introduction of fluid pressure in chamber 62 in normal operation of servo-motor 96 and is moved to its engaged position only in static situations such as parking movable components or in emergency situations to minimize wear of friction facing 82.

Now that the basic teachings of the present invention have been explained, many extensions and variations will be obvious to one having skill in the art. For example, brake 10 in the most preferred form according to the teachings of the present invention incorporates several unique features, and it is believed that such incorporation produces synergistic results. However, it can be appreciated that such features can be utilized separately or in a variety of other combinations according to the teachings of the present invention. As an example, housing 28 including disc 34 of a universal, standard design independent of the particular servo-motor 96 to which housing 28 is to be secured could be utilized in other types of rotational control apparatus including but not limited to linear surface interfacing types according to the preferred teachings of the present invention.

Likewise, in the most preferred form, brake 10 is shown as being fluid disengaged. However, brake 10 according to the teachings of the present invention could be actuated in other manners including but not limited to electrically. In this regard, since the force of spring 94 required to produce the desired force transfer is minimized due to the wedge action produced in the preferred form of the present invention, it is easier to adapt brake 10 to other forms of actuation including those producing a lesser level of actuation force.

Furthermore, although shown in the most preferred form as stopping rotation of input 12, other forms of apparatus 10 for controlling rotation can be designed according to the teachings of the present invention.

Further, it may be desirable to include provisions for providing an electrical signal which provides an indication of the position of friction facing 82. Specifically, and especially in parking or emergency applications, such an electric signal could light an indicator light to provide a visual indication and/or could sound a horn to provide an audible indication of the condition of brake 10 according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Rotational control apparatus comprising, in combination: an input; an output, with the input being rotatable relative to the output about an axis, with the input including an annular interface surface extending at a first nonparallel angle to the axis and extending inwardly toward the axis, with the output having an annular friction surface extending at a second nonparallel angle to the axis extending outwardly from the axis; an annular friction facing of a wedge shape including a first surface for interfacing with the interface surface and a second surface for interfacing with the friction surface; and means for moving the friction facing between an engaged position and a disengaged position, with the first and second surfaces of the friction facing engaging the interface surface and the friction surface to rotatably relate the input, the output, and the friction facing in the engaged position and with the input and output being rotatably independent in the disengaged position.

2. The rotational control apparatus of claim 1 wherein the moving means comprises means for biasing the friction facing from the disengaged position to the engaged position.

3. The rotational control apparatus of claim 2 wherein the moving means further comprises, in combination: a piston slideable relative to the output under fluid pressure, with the piston moving the friction facing from the engaged position to the disengaged position against the biasing means.

4. The rotational control apparatus of claim 1 wherein the input comprises, in combination: a first axial portion; a second axial portion, with the first axial portion including an axial bore adapted to receive an input shaft, with the second axial portion being in the form of a shaft for attachment to a component; and an interface including the interface surface, with the first and second axial portions and the interface being integrally formed from a single material.

5. The rotational control apparatus of claim 1 wherein the output is in the form of a housing, with the housing comprising, in combination: a first housing portion including an annular disc having first and second faces; an axial opening extending between the first and second faces of the annular disc; a plurality of slots extending radially inwardly at circumferentially spaced locations, with each of the slots adapted to receive a screw at different radial spacings from the axis corresponding to a bore of and for attachment to a drive; and an axial recess extending from the second face towards but spaced from the first face and concentric with the axial bore adapted to receive a pilot of the drive.

6. The rotational control apparatus of claim 5 wherein the housing further comprises, in combination: a second housing portion; a plurality of apertures extending between the first and second faces of the annular disc; and a plurality of screws extendable through the plurality of apertures for securing the first and second housing portions together, with the plurality of apertures being circumferentially spaced from the plurality of slots and located radially outward of the axial extending recess.

7. The rotational control apparatus of claim 6 wherein the first housing portion includes a cylindrical member axially extending integrally from the first face of the annular disc, with the cylindrical member including a free end and an outer surface, with an annular shoulder being formed on the free end and the outer surface of the cylindrical member; and wherein the second housing portion includes an annular surface portion of a size and shape for slideable receipt in the annular shoulder of the cylindrical member.

8. The rotational control apparatus of claim 7 further comprising, in combination: a pilot formed on the second housing portion opposite to the first housing portion.

9. The rotational control apparatus of claim 8 wherein the input comprises, in combination: a first axial portion; a second axial portion, with the first axial portion including an axial bore adapted to receive an input shaft, with the second axial portion being in the form of a shaft for attachment to a component; and an interface including the interface surface, with the first and second axial portions and the interface being integrally formed from a single material.

10. The rotational control apparatus of claim 9 wherein the second housing portion includes an axial opening; and wherein the input is rotatably mounted within the second housing portion by a bearing received in the axial opening of the second housing portion and on the second axial portion of the input.

11. The rotational control apparatus of claim 3 wherein the annular friction facing further includes a third surface and a fourth surface, with the third and fourth surfaces being radially oriented, with the first and second surfaces having increasing spacing with increasing spacing from the third surface and having decreasing spacing with increasing spacing from the fourth surface, with the piston abutting against the third surface and the biasing means abutting against the fourth surface.

12. The rotational control apparatus of claim 11 wherein the piston includes an axially extending flange having a free end which abuts against the third surface of the annular friction facing.

13. The rotational control apparatus of claim 11 wherein the free end of the cylindrical member has a radial extent for abutting with the fourth surface of the annular friction facing.

14. The rotational control apparatus of claim 4 further comprising, in combination: an expandable coupling having an outer axial surface for receipt in the axial bore of the first axial portion and an inner axial surface adapted to receive different sizes of input shafts.

15. Rotational control apparatus comprising, in combination: an input; a housing, with the input being rotatably received in the housing about an axis; with the input adapted to be rotatably connected to an input shaft; with the housing comprising, in combination: a first housing portion including an annular disc having first and second faces and a radial outer surface; an axial opening extending between the first and second faces of the annular disc for rotatable receipt of the input shaft; a plurality of slots extending radially inwardly from the outer surface of the annular disc at circumferentially spaced locations, with each of the slots adapted to receive a screw at different radial spacings from the axis corresponding to a bore of and for attachment to a drive including the input shaft; and an axial extending recess extending from the second face towards but spaced from the first face and concentric with the axial bore adapted to receive a pilot of the drive.

16. The rotational control apparatus of claim 15 wherein the housing further comprises, in combination: a second housing portion; a plurality of apertures extending between the first and second faces of the annular disc; and a plurality of screws extendable through the plurality of apertures for securing the first and second housing portions together, with the plurality of apertures being circumferentially spaced from the plurality of slots and located radially outward of the axial extending recess.

17. Rotational control apparatus comprising, in combination: an input; a housing, with the input being rotatably received in the housing about an axis; with the input adapted to be rotatable connected to an input shaft; with the housing comprising, in combination: a first housing portion and a second housing portion, wherein the first housing portion includes an annular disc having first and second faces and a radial outer surface and a cylindrical member axially extending integrally from the first face of the annular disc, with the cylindrical member including a free end and an outer surface, with an annular shoulder being formed on the free end and the outer surface of the cylindrical member; wherein the second housing portion includes an annular surface portion of a size and shape for slidable receipt in the annular shoulder of the cylindrical member; an axial opening extending between the first and second faces of the annular disc for rotatable receipt of the input shaft; and a plurality of slots extending radially inwardly from the outer surface of the annular disc at circumferentially spaced locations, with each of the slots adapted to receive a screw for attachment to a drive including the input shaft.

18. The rotational control apparatus of claim 17 further comprising, in combination: a pilot formed on the second housing portion opposite to the first housing portion.

19. The rotational control apparatus of claim 18 wherein the input comprises, in combination: a first axial portion; a second axial portion, with the first axial portion including an axial bore adapted to receive an input shaft, with the second axial portion being in the form of a shaft for attachment to a component; and an interface, with the first and second axial portions and the interface being integrally formed from a single material.

20. The rotational control apparatus of claim 19 wherein the second housing portion includes an axial opening; and wherein the input is rotatably mounted within the second housing portion by a bearing received in the axial opening of the second housing portion and on the second axial portion of the input.

21. The rotational control apparatus of claim 17 further comprising, in combination: an axial extending recess extending from the second face towards but spaced from the first face and concentric with the axial bore adapted to receive a pilot of the drive; a plurality of apertures extending between the first and second faces of the annular disc; and a plurality of screws extendable through the plurality of apertures for securing the first and second housing portions together, with the plurality of apertures being circumferentially spaced from the plurality of slots and located radially outward of the axial extending recess.

* * * * *